United States Patent [19]

Hehl

[11] Patent Number: 4,668,178
[45] Date of Patent: May 26, 1987

[54] ROLLER SUPPORT FOR INJECTION UNIT OF INJECTION MOLDING MACHINE

[76] Inventor: Karl Hehl, Arthur-Hehl-Strasse 32, 7298 Lossburg 1, Fed. Rep. of Germany

[21] Appl. No.: 814,235

[22] Filed: Dec. 30, 1985

[30] Foreign Application Priority Data

Dec. 28, 1984 [DE] Fed. Rep. of Germany ....... 3447597

[51] Int. Cl.⁴ .......................................... B29C 33/30
[52] U.S. Cl. .................. 425/589; 425/406; 425/441; 425/451
[58] Field of Search ............... 425/588, 589, 594, 406, 425/441, 450.1, 451, 451.9

[56] References Cited

U.S. PATENT DOCUMENTS

| | | | |
|---|---|---|---|
| 3,674,400 | 7/1972 | Sauerbrunch et al. | 425/556 |
| 4,090,837 | 5/1978 | Balevski et al. | 425/588 |
| 4,315,728 | 2/1982 | Hehl | 425/450.1 |
| 4,453,912 | 6/1984 | Hehl | 425/589 |
| 4,487,569 | 12/1984 | Hehl | 425/451 |
| 4,530,655 | 7/1985 | Hehl | 425/589 |

FOREIGN PATENT DOCUMENTS 1079286 8/1967 United Kingdom ............... 425/589

*Primary Examiner*—Tim Miles
*Attorney, Agent, or Firm*—Schwartz, Jeffery, Schwaab, Mack, Blumenthal & Evans

[57] ABSTRACT

An injection unit is disclosed with bridges for the plastification cylinder and for the plastification screw, which bridges are movable on fixed guide rods. There is a central injection cylinder and drive cylinders located diametrically with respect thereto. The pistons of the drive cylinders are firmly seated on the guide rods. A support device supports the injection unit on the machine pedestal of the plastic injection molding machine. The support device includes a fixed support, a movable support, and an elevation adjuster which transmits the supported load. The movable support is fastened to at least one of the bridges. With such an arrangement, bending of the support rods is virtually prevented during an injection operation.

9 Claims, 3 Drawing Figures

ROLLER SUPPORT FOR INJECTION UNIT OF INJECTION MOLDING MACHINE

BACKGROUND OF THE INVENTION

1. FIELD OF THE INVENTION

The invention pertains to an injection molding unit for an injection molding machine. The injection unit cooperates with a mold and is supported on a stationary machine pedestal. The injection unit includes a pair of bridges capable of moving on guide rods, one of the bridges carrying a plastification cylinder with a plastification screw therein. The injection unit also includes an injection cylinder for advancing the plastification screw in an injection stroke along an injection axis and hydraulic drive cylinders cooperating with drive pistons on the guide rods to drive the injection unit.

2. DESCRIPTION OF THE PRIOR ART

Known injection units of this type are disclosed, for example, in German Offenlegungsschrift Nos. 20 20 337; 30 13 426 (which corresponds with U.S. Pat. No. 4,293,229); 29 07 556—FIG. 2 (which corresponds with U.S. Pat. No. 4,251,204); and German Auslegeschrift No. 1 961 819 (which corresponds with U.S. Pat. No. 3,729,280). Such injection units are supported exclusively by their guide rods, that is, by fixed parts. In these cases the supporting elements, in particular support brackets, fit into the rear ends of the guide rods, such that in each case the axial distance between the front and rear support points on the guide rods is large enough to enable the drive cylinder and injection cylinder or cylinders to slide forward and/or back.

In the injection unit as described by German Offenlegungsschrift No. 20 20 337, a glide footing is additionally attached to the bridge which carries the plastification cylinder. However, when the injection unit is in the operating position, it is located at some distance from the top of the plastic injection molding machine's pedestal. This glide footing can thus support the injection unit only when it is retracted from its operating position. It is therefore no more than an aid for use in retracting the injection unit.

It has been shown that, when the known injection units under consideration are subjected to intensive use over long periods of time, precision guiding deteriorates, which is clearly the result of the periodic bending of the guide rods under the load of the injection unit during injection cycles. This then becomes a disadvantage, for example, when the nozzle of the injection unit forms part of the confines of the injection mold cavity.

SUMMARY OF THE INVENTION

An object of the invention is to support an injection unit of the general type described above in such a way that the repeated bending of the guide rods, in particular when using heavy injection units, is significantly reduced, without increasing the dimensions of the guide rods.

This object is attained according the invention by providing a movable support for affixation with respect to one of the bridges and movable therewith; a stationary support for affixation with respect to the pedestal; and an elevation adjuster attached between the movable support and the stationary support to adjust the elevation of the injection unit with respect to the pedestal. The elevation adjuster includes a roller, the roller being carried by a pivotable eccentric, so that pivoting of the eccentric adjustably displaces the roller vertically so that the movable support may be moved relative to the stationary support to adjust the elevation of the injection unit with respect to the pedestal. The elevation unit also includes a trunnion, and the stationary support includes a support pillar formed by a hollow piece. The eccentric is mounted on the support pillar by the trunion. The eccentric is surrounded by the roller. The movable support includes a support member for supporting the bridges and a strip on the support member, the roller being disposed on the stationary support, the strip providing a track on which the roller rolls during actual movement of the injection unit.

The bridges supported by the support member are supported with respect to each other by the drive cylinders and the injection cylinder. The bridges form a structural unit with respect to such cylinders so that the axes of the cylinders lie in a horizontal plane.

The drive cylinders have front ends including front cylinder heads. A support bracket additionally supports the injection unit on the pedestal. The support bracket fits into the guide rods at a level which lies directly in front of the front cylinder heads of the drive cylinders when the injection unit is applied to the mold.

The support bracket includes a U-shaped element with a transverse member and a pair of parallel legs extending therefrom, the transverse member being for resting on the pedestal transverse to the injection axis. A connecting piece runs between the stationary support and the transverse member of the support bracket. This connecting piece removably connects the stationary support to the transverse member of the support bracket.

With the arrangement of the present invention, it is possible to relocate the rear support for the injection unit significantly forward, in particular in the vicinity of the injection molding machine's center of gravity, because the drive cylinder no longer needs to be taken into consideration when selecting the optimal support point. In this manner, the guide rods are relieved, to a great extent, of their function as loadbearing elements, thanks to the support being located closer to the injection unit's center of gravity.

This removal of load from the guide rods is improved even more by use of decompression or retraction cylinders, in each of which cylinders is a plunger piston attached to the rear bridge which bears the plasticizer screw, which plunger pistons are located diametrically opposite each other around the rotary drive motor for the plasticizer screw and which plunger pistons are connected to the rotary drive motor via the decompression cylinders. This significantly shortens the part of the injection unit that extends rearward beyond the support point of the 5 support device, and which is supported in particular by the structural unit comprising the two bridges, and not by the guide rods.

In an embodiment of this sort, the plunger pistons of the decompression cylinders of the decompression device furthermore serve as rotation governors for the rotary drive motor. This obviates the need for a separate rotation governing device, which would add to the load on the rear of the injection unit.

The decompression cylinders make it possible to separate injection units having an open, i.e., not closeable, nozzle, from the injection mold temporarily during each injection cycle for the purpose of preventing the transfer of heat to the injection mold; in this case, the pressure on the plastic material in the plastification cylinder is relieved when the decompression cylinder executes an appropriate slide to the rear.

Further reduction of the periodic bending of the guide rods results from the weight reducing arrangement in which the bridges are supported with respect to each other by the drive cylinders and injection cylinder to form a structural unit with such cylinders so that the axes of the cylinders lie in one horizontal plane.

DETAILED DESCRIPTION OF THE PREFERRED EMBODIMENTS

Figure 1:
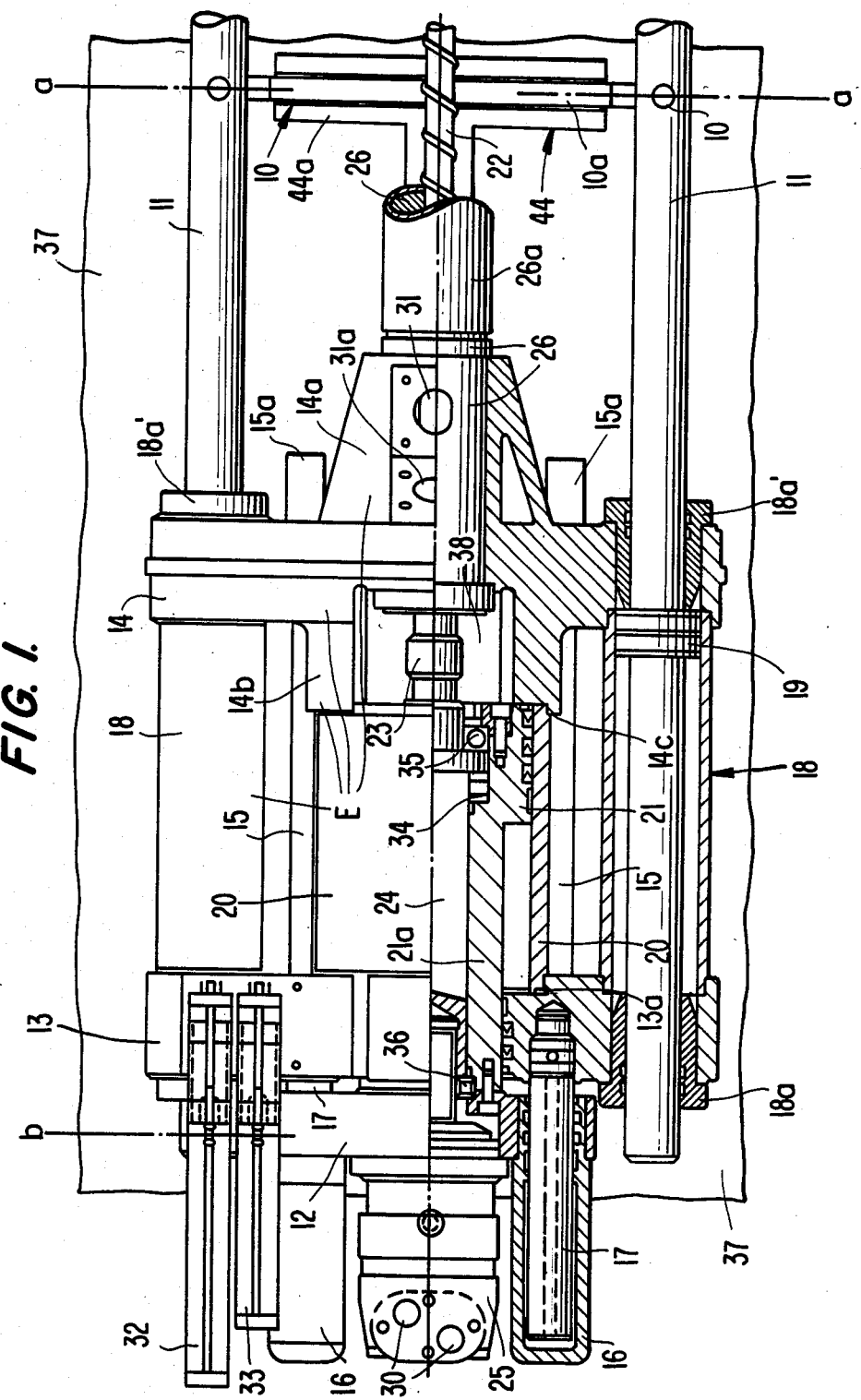
FIG. 1 is a plan view of a device according to the present invention.
Figure 2:
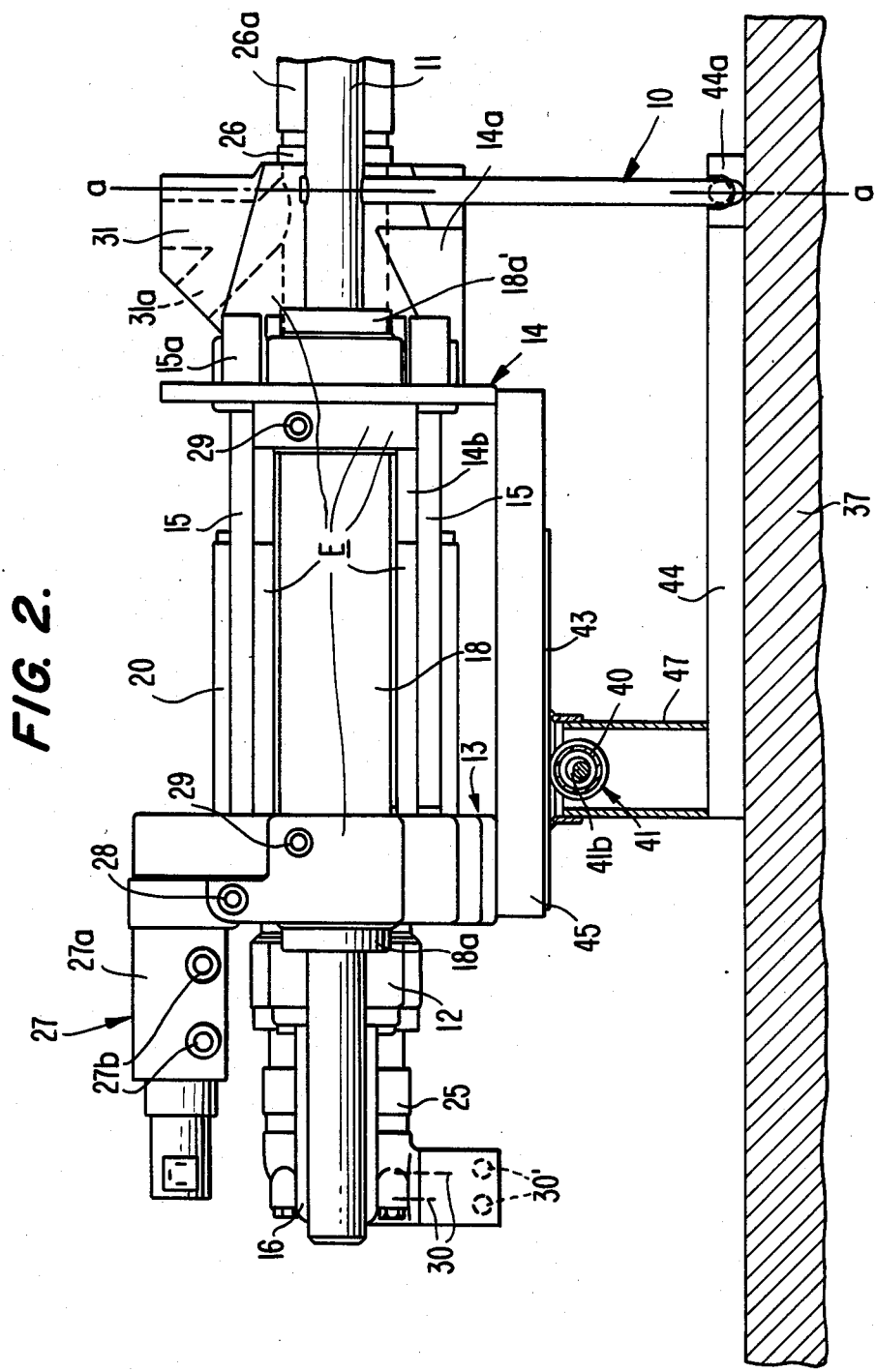
FIG. 2 is a side elevation of the device of FIG. 1.
Figure 3:
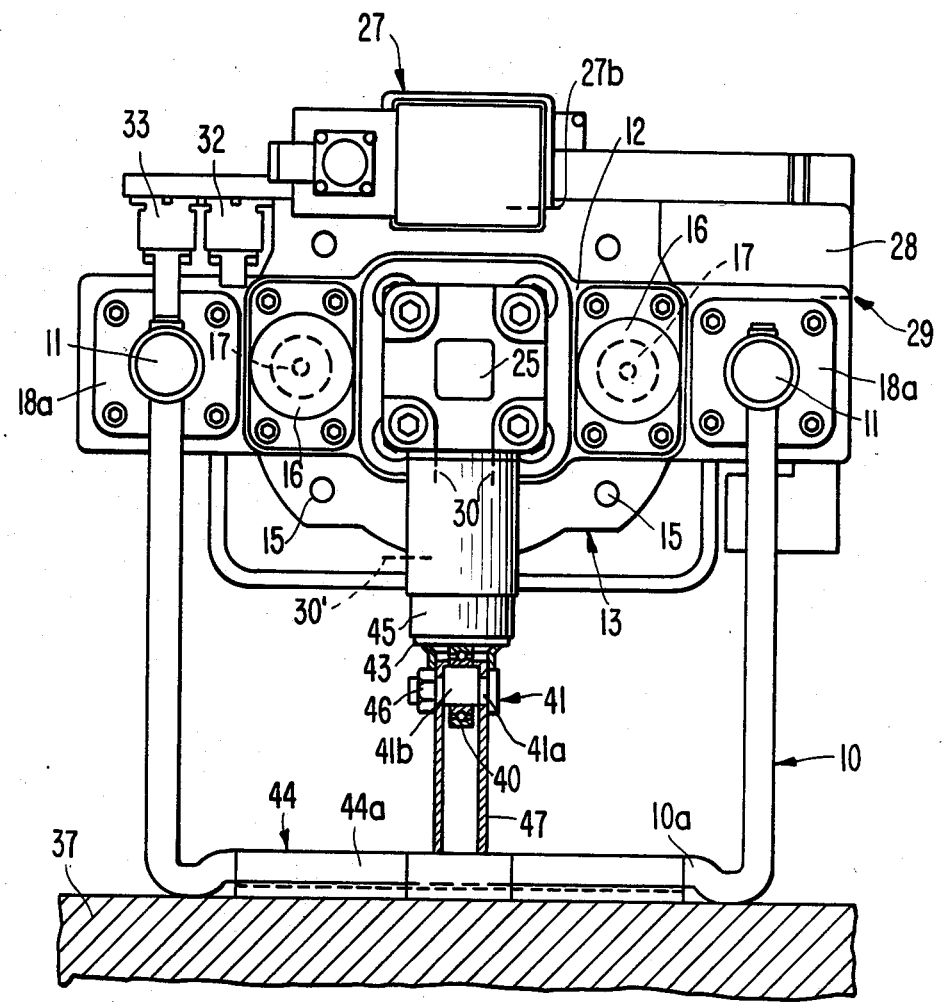
FIG. 3 is a front end elevation of the device of FIG. 1.

The injection unit comprises a bridge 14 which is able to slide on the guide rods 11 of a pair of guide rods, and which carries the plastification cylinder 26 equipped with a plastification screw 22 and heating sleeves 26a. The plastification cylinder fits into a central hole in the bridge 14, which bridge is lengthened in the axial direction by an extension 14a that projects forward. The injection unit furthermore has a hydraulic injection cylinder 20, 21 for the injection stroke of the plastification screw 22, which cylinder lies in the injection axis and can be loaded from one side. The cylinder 20 of injection cylinder 20, 21 is kept centered within matching annular shoulders 14c by tabs 14b diametrically opposed around the diameter of the injection axis. These tabs form the boundary of a vertical passage 38 in the bridge 14. At the rear, the cylinder 20 is centered in another bridge 13 on annular shoulders 13a. Two hydraulic drive cylinders 18, 19 which drive the injection unit, that is, which move it toward and away from the injection mold, are disposed in diametrically opposed fashion around the injection cylinder 20, 21 and coaxially with the guide rods 11. The drive pistons 19 are firmly seated on the guide rods 11. The axes of cylinder 18 and cylinder 20 lie in the same plane. Decompression or retraction cylinders 16, 17 are furthermore provided for the reverse stroke of the plasticizer screw.

The plasticizer screw forms an axially moving unit with its coaxial rotary drive motor 25, the piston 21 of the injection cylinder 20, 21, and the cylinders 16 of the decompression cylinders 16, 17. Cylinders 20, 18 of the injection cylinder 20, 21 and of the drive cylinders 18, 19 form a structural unit E with the two cross-members 13, 14, which structural unit is mounted on the pistons 19 or guide rods 11 in such a way that it is capable of sliding on them via the cylinder heads 18a of the drive cylinders. Two decompression cylinders 16, 17 having plunger pistons 17 are disposed in diametrically opposed fashion around the rotary drive motor 25. The plunger pistons 17 are rigidly connected to structural unit E. The cylinders 16 of the decompression cylinder 16, 17 are anchored to the flange 12 of the rotation motor 25. In the exemplary embodiment portrayed in the drawing, each of the plunger pistons 17 is screwed to the adjacent bridge 13 via a threaded portion on its front. The rotary drive motor 25 with its pump hose and tank hose connections 30 is connected by means of a coupling 23 to the plasticizer screw 22 through the spindle 24 which passes through the piston 21 and its piston rod 21a. The injection pressure of the piston 21 is transmitted via an axial thrust bearing 34 to the spindle 24 and from there to the spiral conveyor 22. The axial thrust bearing abuts a radial flange on the spindle. A combined radial/axial thrust bearing 35 is disposed on the front of the radial flange, which bearing receives the axial forces when the plasticizer screw 22 retracts.

An anti-backlash element 36 prevents undesired rotation of the spindle 24 and spiral conveyor 22 during the forward stroke. The two bridges 13, 14 are pulled together by tie rods 15 and at the same time are supported and spaced by the cylinders 18, 20. The compression nuts 15a for the tie rods 15 are easily accessible, as can be seen from the drawing. The cylinders 18, 20 are formed of steel casings, the bridges 13, 14 of cast iron. The inside diameter of the cylinder 20 of the injection cylinder 20, 21 is approximately four times the inside diameter of the cylinder 16 of the decompression cylinders 16, 17. The coupling 23 between the spindle 24 and the spiral conveyor 22 is accessible via passage 38. Hydraulic flow controllers 32 and 33 are components of the injection unit's hydraulic control system. Hydraulic flow controller 32 is for advancing and retraction of the injection unit to and from the mold. Hydraulic flow controller 33 is for controlling the operation of the plastification screw 22. During preplastification, the axially movable unit consisting of the rotating plastification screw 22, the spindle 24 and rotary drive 25, and cylinders 16 with flange 12 moves back out of the way under dynamic pressure of the preplastifying material when the nozzle is applied. This sucks oil into the enlarging space within the cylinders of decompression cylinders 16, 17. The maximum stroke of these cylinders necessarily matches the maximum stroke of the piston 21 of the injection cylinder 20, 21 when the plastic is injected into the injection mold, or during preplastification.

The back of the injection unit can be supported on the machine pedestal 37 of the plastic injection molding machine through its two bridges 13 and 14. This is made possible by a support device provided with a roller 40. The support device in the exemplary embodiment shown in the drawing has a single roller 40 which is located in the plane of vertical symmetry of the injection unit. The elevation of roller 40 can be adjusted by means of an eccentric 41b. The eccentric 41b is mounted in the walls of support pillar 47 by means of a trunnion 41a. The roller 40, on ball bearings, is disposed so that it can rotate with respect to the eccentric 41b. By setting the elevation of the support device appropriately, it is possible to compensate for manufacturing tolerances which affect the distance between the elevation of the injection unit support device and the top of the machine pedestal. Besides the hollow support pillars 47 and the eccentric 41b and its roller 40, the support device includes a support member 45 reinforced by a hardened strip 43. The support member runs between the bridges 13, 14 and is fastened to them.

The strip 43 forms the track for the roller 40. Each time the injection unit is moved toward or away from the injection mold, the injection unit "runs" to a certain extent on the roller 40 in the direction of the injection mold or away from it, while the greater part of the load of the injection unit is transmitted through the support member 45 with the hardened strip 43 to the roller 40 of the support device. The support device thus is composed of a fixed support element 44, 47, a movable support element 43, 45 and an elevation-adjustment device 41 to transmit the supported load. A roller 40, or runner, facilitates relative movement between the support elements 44, 47, 43, 45.

It is to be noted the drive cylinders 18, 19 have front ends including front cylinder heads 18a'. The injection unit is additionally supported on the machine pedestal 37 by means of support bracket 10 which fits into the guide rods 11 at level a—a, which lies directly in front of the front cylinder heads 18a' of the drive cylinders 18, 19 when the injection unit is applied to the injection mold. The support bracket 10 includes a U-shaped element with a transverse member 10a which rests on top of the machine pedestal 37 transverse to the injection axis. A connecting piece 44 runs between the stationary support 44, 47 and the support bracket 10. Connecting piece 44 removably connects to the stationary support of 44, 47 to the transverse member 10a of the support bracket 10.

What is claimed is:

1. An injection unit support device for supporting a plastics injection unit with respect to a stationary pedestal of an injection molding machine, the injection unit being for cooperation with a mold, the injection unit including a first carrier bridge which is movable on guide rods and which first carrier bridge carries a plastification cylinder fitted with a plastification screw, the injection unit including a hydraulic injection cylinder for effecting an injection stroke of the plastification screw, the injection unit including hydraulic drive cylinders, coaxial to the guide rods for the axial movement of the injection unit which, during injection molding, is moved up against and back from the mold in periodic movements to provide injection cycles, wherein said drive cylinders include drive pistons which are fixedly mounted on said guide rods, the plastification screw, which is coupled with a rotary drive motor, being held by a second carrier bridge which is movable with respect to said guide rods, the injection unit being coupled with a support apparatus for supporting the injection unit on the pedestal of the plastics injection molding machine, wherein the carrier bridges are supported axially with respect to each other by sleeves forming said drive cylinders and by a sleeve forming the injection cylinder, the cylinders together forming a structural unit, and wherein the support apparatus comprises: a movable support for movement with the injection unit through the injection cycles, said movable support being secured with respect to the carrier bridges; a stationary support having an elevation adjuster; and a roller coupled with the stationary support, the roller lying in contact with the movable support, which movable support includes a portion which serves as a track for the roller and which movable support is supported with respect to the carrier bridges.

2. The invention as claimed in claim 1, wherein the axes of the drive and injection cylinders lie in a horizontal plane.

3. The invention as claimed in claim 1 wherein, wherein said elevation adjuster is attached between said movable support and said stationary support to adjust the elevation of the injection unit with respect to the pedestal.

4. The invention as claimed in claim 1, wherein said roller is carried by a pivotable eccentric, so that pivoting of said eccentric adjustably displaces the roller vertically, whereby said movable support may be moved relative to said stationary support to adjust the elevation of the injection unit with respect to the pedestal.

5. The invention as claimed in claim 4, wherein said elevation adjuster includes a trunnion and wherein said stationary support includes a support pillar formed by a hollow piece, said eccentric being mounted on said support pillar by said trunnion, said eccentric being surrounded by said roller.

6. The invention as claimed in claim 1, wherein the drive cylinders have front ends including front cylinder heads and including a support bracket for additionally supporting the injection unit on the pedestal, which support bracket fits into the guide rods at the level which lies directly in front of the front cylinder heads of the drive cylinders when the injection unit is applied to the mold.

7. The invention as claimed in claim 6, wherein the support bracket includes a U-shaped element with a transverse member and a pair of parallel legs extending therefrom, the transverse member being for resting on the pedestal across the injection axis.

8. The invention as claimed in claim 7, including a connecting piece running between said stationary support and said transverse member of said support bracket, said connecting piece removably connecting said stationary support to said transverse member of said support bracket.

9. The invention as claimed in claim 7, wherein the injection unit includes decompression cylinders having plunger pistons therein, which plunger pistons are attached to one of said bridges, the plunger pistons being located diametrically opposite each other around the rotary drive motor, the plunger pistons being connected to the rotary drive motor via the decompression cylinders.

* * * * *